United States Patent [19]

Clark et al.

[11] Patent Number: 4,757,389
[45] Date of Patent: Jul. 12, 1988

[54] CALIBRATION IMPROVEMENT WITH DITHER FOR A RASTER INPUT SCANNER

[75] Inventors: Raymond J. Clark, Webster; Leon C. Williams, Penfield, both of N.Y.

[73] Assignee: Xerox Corporation, Stamford, Conn.

[21] Appl. No.: 61,745

[22] Filed: Jun. 15, 1987

[51] Int. Cl.⁴ .................................................. H04N 1/387
[52] U.S. Cl. ...................................... 358/298; 358/283
[58] Field of Search ............... 358/280, 283, 298, 139, 358/213.15, 213.18, 213.17

[56] References Cited

U.S. PATENT DOCUMENTS

| | | | |
|---|---|---|---|
| 4,196,454 | 4/1980 | Warren | 358/298 X |
| 4,495,522 | 1/1985 | Matsunawa et al. | 358/280 |
| 4,517,605 | 5/1985 | Yokomizo | 358/280 |
| 4,517,606 | 5/1985 | Yokomizo et al. | 358/280 |
| 4,531,160 | 7/1985 | Ehn | 358/298 X |
| 4,556,918 | 12/1985 | Yamazaki et al. | 358/283 |
| 4,663,662 | 5/1987 | Sekizawa | 358/280 |

FOREIGN PATENT DOCUMENTS 0147376  9/1982  Japan .................................. 358/283

Primary Examiner—Howard W. Britton
Assistant Examiner—Victor R. Kostak
Attorney, Agent, or Firm—Frederick E. McMullen

[57] ABSTRACT

A raster input scanner in which a dither generator introduces a random error signal to artificially increase the calibration signal accuracy during calibration of the scanner.

5 Claims, 5 Drawing Sheets

TRANSFER FUNCTION OF A/D CONVERTER (53)

DITHER WAVEFORM AND MEAN

SAMPLE SIGNAL WITH DITHER ADDED

CALIBRATION IMPROVEMENT WITH DITHER FOR A RASTER INPUT SCANNER

The invention relates to a system for correcting for photosensor non-uniformity in an image scanning array, and more particularly, to a system for more accurately determining the correction values required to effect such correction.

In electronic imaging systems, an electro-optical sensor or array such as a Charge Coupled Device (CCD) is utilized to convert light intensity representing an original image into an analog voltage. This voltage is then converted into the digital domain by using an analog to digital converter for further processing and use. In order to get the most accurate representation of the image, imperfections among the photosensors of the scanning array such as cell to cell gain variations, DC offsets, etc., require correction. Typically, this is done during a calibration period by illuminating the array to a uniform intensity during which correction values necessary to compensate for any imperfections among the photosensors are determined and stored for later use during image scanning.

In the typical calibration cycle the correction values, which are in the form of voltages, are derived through digital processing of the signals output by the array photosensors. Since the image signal output by the array is analog, image signals must be converted to digital for calculation of correction values. However, in this type of approach, where the correction values are determined in the digital domain, the accuracy with which the correction values can be determined is limited by the resolution of the A/D converter. While higher resolution A/D converters may be used to rectify or alleviate this problem and enhance accuracy, it is at the expense of reduce system processing speeds since higher resolution A/D converters have a lower processing speed than lower resolution A/D converters, and/or higher cost. Thus, where a high speed electronic imaging system is of paramount importance, it may not be possible to improve calibration accuracy through the use of a higher resolution A/D converter.

In the prior art, U.S. Pat. No. 4,495,522 to Matsunawa et al discloses a screen or dither system for recording a picture image in which the original picture image is divided into lateral and vertical blocks N, M respectively, with each block discriminated to identify, whether the picture data in the block is either a line picture or a photograph. In U.S. Pat. No. 4,517,605 to Yokomizo, an image signal processing system is used employing a dither matrix that is subdivided into plural smaller matrices to provide matrices having desirable lower spatial frequencies, while in U.S. Pat. No. 4,517,606 to Yokomizo et al, a video signal processing apparatus for handling photographs containing halftone in a facsimile system is shown in which the picture elements are subdivided into plural groups and encoded using threshold levels that are periodically changed for each group. And, in U.S. Pat. No. 4,556,918 to Yamazaki et al, there is shown a system for generating screened halftone images in which an area of the halftone dots is subdivided into cells, a threshold value computed for each cell, and, using the value computed, a density-related video signal is provided.

In contrast to the prior art, the present invention adds dither to an analog signal prior to digitization by an A/D converter and then numerically averages the plurality of samples obtained to produce a result of higher resolution than is intrinsic in the A/D converter to thereby provide a calibration method for obtaining accurate correction values for correcting for non-uniformity among the photosites of a scanning array, in which the steps comprise: scanning a calibration image of preset density to provide an image signal output from each of the array photosites; introducing a dither signal into the image signal output of each of the photosites to provide an artificially distorted image signal output from each of the photosites; converting the distorted image signals to digital signals; averaging a plurality of such artificially distorted signals from each photosite; determining a digital correction voltage for correcting nonuniform photosensors of the array; and converting the digital correction voltages to analog and adjusting the image signal outputs of the nonuniform uniform photosites by combining the image signal output of each photosite with the corrective voltage for that photosensor.

IN THE DRAWINGS

Figure 6:
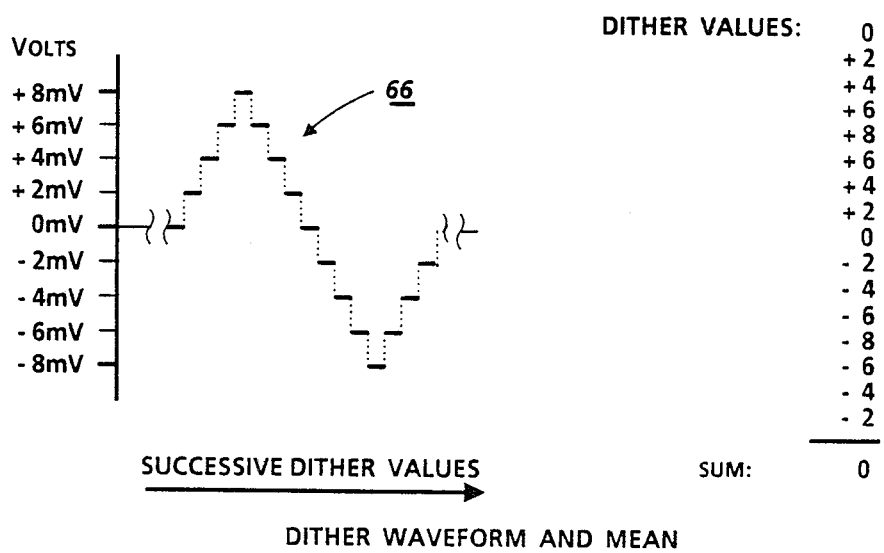
Figure 7:
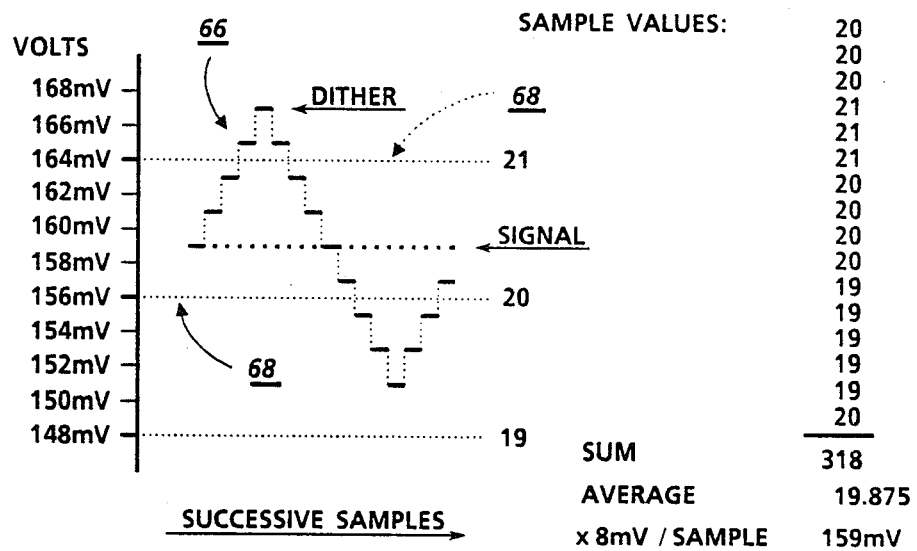

FIG. 6 is a graphical representation depicting an exemplary dither waveform having a mean of zero of the type used in the calibration system of the present invention; and FIG. 7 is a graphical representation dipicting a dither waveform superimposed on the image signal output of the array photosensors when scanning a calibration image in accordance with the calibration system of the present invention.

Figure 1:
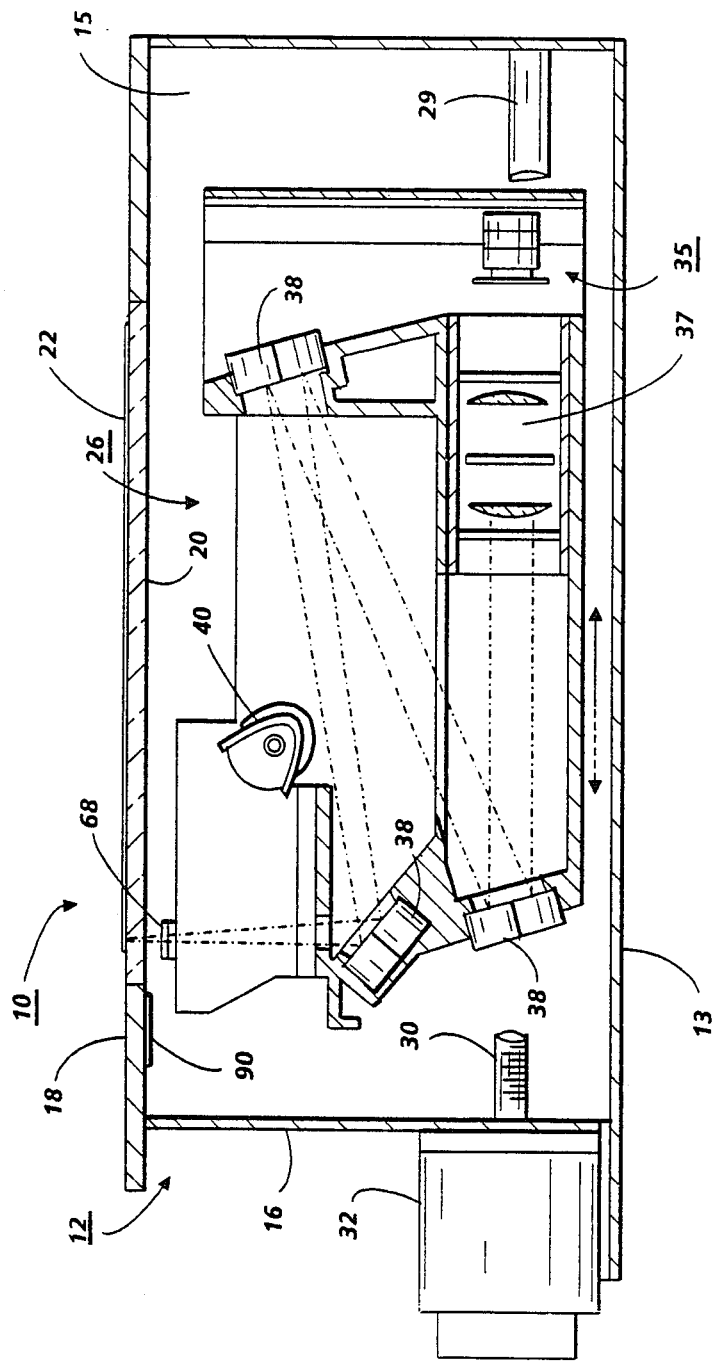
FIG. 1 is a schematic view of a raster input scanner of the type adapted for use with the calibration system of the present invention.
Figure 2:
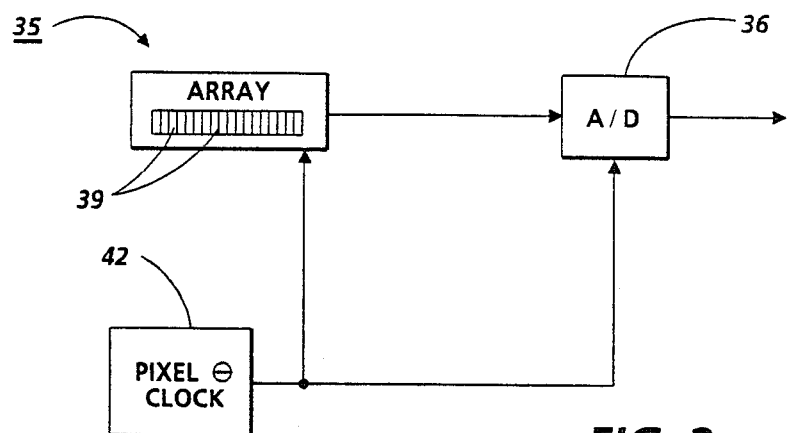
FIG. 2 is a schematic view of a scanner video output circuit without correction for photosensor non-uniformity.

Referring to FIGS. 1 and 2, there is shown an exemplary raster input scanner, designated generally by the numeral 10, of the type with which the calibration system of the present invention is intended to be used. Scanner 10 includes a housing 12 with base 13, sides 15, and ends 16. The top 18 of housing 12 incorporates a generally rectangular transparent platen 20, typically glass, sized to accommodate the largest document original 22 to be scanned. As will be understood, a document 22 to be scanned is located either manually or by a suitable automatic document handler or feeder (not shown), on platen 20 for scanning. A scan carriage 26 is movably supported within housing 12 on base 13 for reciprocable movement underneath platen 20 on one or more longitudinally extending rails 29. Carriage driving means in the form of a drive screw 30 threadedly engaged with carriage 26 is provided, rotation of screw 30 in either a clockwise or counter-clockwise direction by a reversible carriage driving step motor 32 serving to move carriage 26 in either a forward or reverse direction as shown by the arrows in drawing FIG. 1.

A scanning array 35 such as a CCD is suitably mounted on scan carriage 26 in predetermined operative relation with platen 20 so as to scan the document resting thereon. Suitable optical means, exemplified here by lens 37 and mirrors 38, are provided to focus array 35 on a line-like area extending across the width of platen 20 and perpendicular to the direction of movement of carriage 26. A lamp 40 is provided for illuminating the line-like area on which array 35 is focused. A suitable pixel clock 42 (seen in FIGS. 2-4) provides the necessary clock signals for operating array 35. The image signals generated by scanning array 35 are converted to digital form by an analog-to-digital (A/D) converter 36 for additional processing and output to a workstation or user (not shown).

While a single scanning array 35 is shown and described, plural arrays may instead be envisioned.

As will be understood, imperfections in array 35 typically result in non-uniformity, as for example cell to cell gain variations, D.C. offsets, etc. between the photosensors 39 of array 35. If not compensated for, the image signal or pixel output of array 35 will provide inaccurate representations of the image scanned.

To correct for variations such as offset and gain between the array photosensors 39, array 35 is calibrated before use. Calibration values in the form of correction voltages are obtained for each photosensor which is thereafter used to adjust the image signal output of each photosensor to correct for any differences between photosensors. Two corrective voltages are obtained, one for additive (offset) and one for multiplicative (gain) correction.

Figure 3:
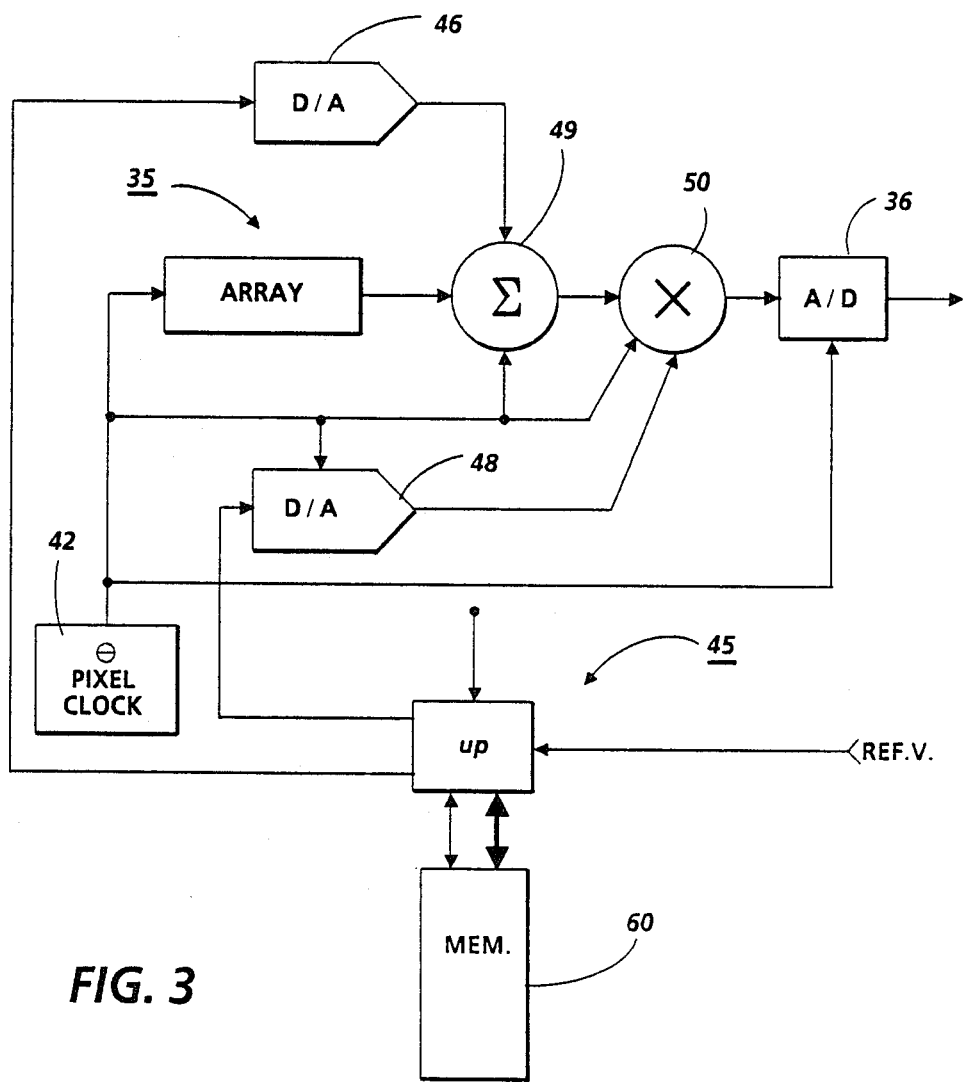
FIG. 3 is a schematic view of a scanner video output circuit with correction for photosensor non-uniformity.

Referring particularly to FIGS. 1 and 3, for calibration purposes, the array 35 scans a uniform grey image on a calibration strip 90 illuminated by lamp 40. Typically, a plurality (N) of calibraion scans are carried out during a prescan cycle, with the result averaged to obtain data for the calculation of a correction voltage for each photosensor 39 of array 35. The offset correction voltages obtained are output by a microprocessor controller 45 through D/A converter 46 (which converts the offset correction voltages to analog) to additive circuit 49 which algebraically combines the offset correction voltages with the signals output by array 35. The gain correction voltages obtained are output by controller 45 though D/A converter 48 (which converts the correction voltages to analog) to multiplication circuit 50 which multiplies the offset corrected signals output by array 35 with the gain correction voltages to provide corrected image signals.

Following completion of the calibration cycle, the offset and gain correction voltages are stored in a suitable memory 60. During subsequent scanning, the correction voltages are read from memory 60 in timed synchronization with the image signal output of the individual photosensors by controller 45 and output via D/A converters 46, 48 to circuits 49, 50 respectively to correct the image signal output of array 35.

In the calibration system described above, the accuracy with which correction is made is limited by the resolution (i.e., a number of bits) of the A/D converter 36. To achieve high image processing speeds however, the resolution of A/D converter 36 must be limited and this effectively precludes using a higher resolution A/D converter to obtain a more accurate correction voltage since use of a higher resolution A/D converter imposes a penalty in the form of slower processing speeds and/or higher cost.

Figure 4:
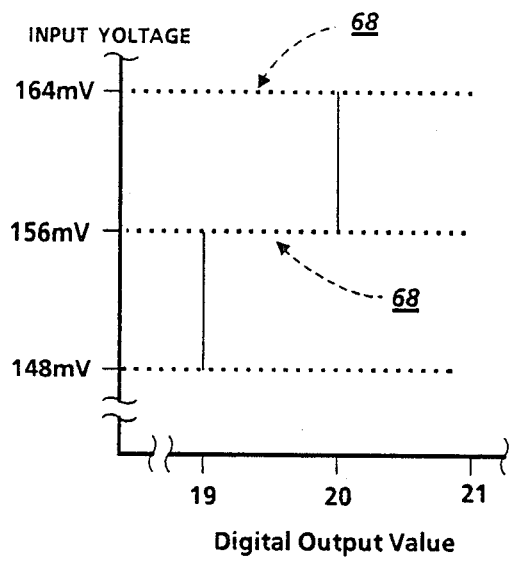
FIG. 4 is a graphical representation depicting typical A/D converter transfer function and attendant quantization error.

Referring now to FIG. 4, a portion of the transfer function of the A/D converter 36 is shown. There, and using the numerical examples provided, it can be seen that for any input voltage between 156 millivolts (mv) and 164 mv, a digital output value of 20 is generated. It is intrinsic to A/D converters such as converter 36 that the input voltage is resolved in discrete steps or thresholds (designated by the numeral 68). For example, such steps may be 8 mv each. This results in an error termed the quantization error. Thus, the resolution of an A/D converter such as converter 36 provides the desired high image quality during scanning only if the system is properly calibrated. However, if the same A/D converter, i.e., converter 36, is also used to gather data to calculate the offset potential of D/A converters 46, 48, a similar quantization error will be introduced in setting converters 46, 48. Thus, the data used to later calculate the gain correction values will include not only the quantization error of A/D converter 36, but also the error introduced in the offset and gain settings of D/A converters 46, 48. Thus, during scanning, the image data would include the sum of the quantization errors occurring during offset calibration, gain calibration, and scanning. Normally, these accumulated errors would result in unacceptable image quality.

Figure 5:
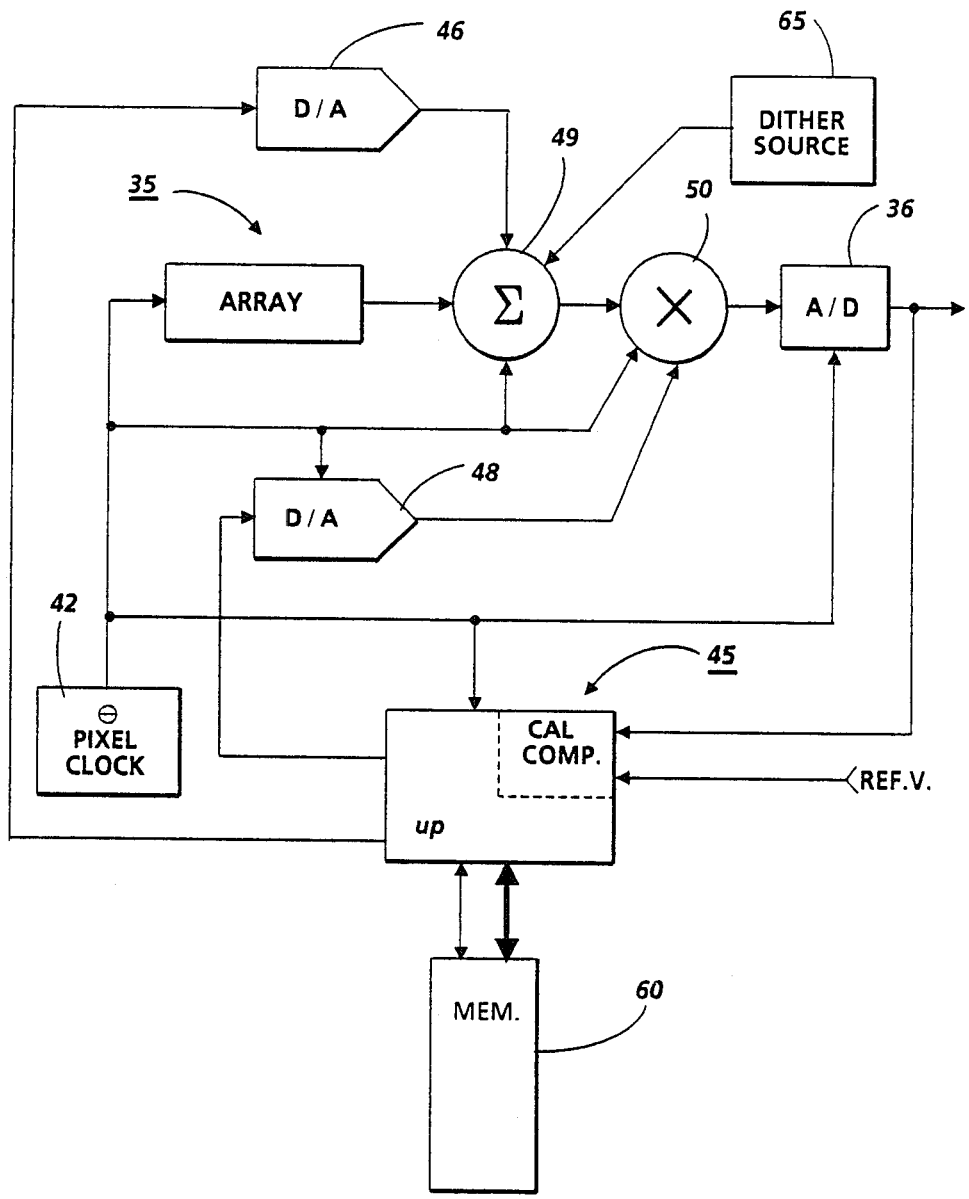
FIG. 5 is a schematic view of the calibration circuit of the present invention in which a dither signal is added to the image signals obtained during calibration to enhance the accuracy of the correction values obtained.

Referring particularly to FIG. 5, to render the aforedescribed calibrations more accurate and eliminate or at least reduce quantization erros, the calibration system of the present invention is provided. For offset calibration and gain calibration, several scan lines are taken and averaged together to average out various sources of noise and reduce the effect of any noise on the accuracy of calibration. In addition, a controlled dither derived from a dither source 65, is introduced into the calibration signal through offset D/A converters 46, 48 respectively. Dither source 65 may comprise any suitable means for generating a dither waveform, as for example, by manipulating the offset value of D/A converter 46 in software, suitable dither generating circuitry, etc. The dither interacts with the A/D converter 36 and the aforementioned averaging to increase the effective resolution of the A/D converter 36 by several bits, resulting in more precise data. And, since the dither waveform has a means of zero over the data averaged, the introduction of a random dither error signal does not effect the resulting average.

More particularly and referring now to FIG. 6, there is shown an example of the dither waveform 66 output of dither source 65 superimposed on the analog input to A/D converter 36 by gain and offset D/A converters 46, 48 respectively. As can be seen and as shown by the exemplary dither values, if the dither waveform 66 is averaged over an integral number of cycles under control of controller 45, the result is zero. Thus, proper introduction of dither into the calibration signal will not affect the data.

Referring now to FIG. 7, an image signal or pixel, which for exemplary purposes only is assumed to have a value of 159 mv, with the dither waveform 66 of FIG. 6 imposed thereon is shown. The horizontal dotted lines 68 represent the thresholds of A/D converter 36. As will be understood, the digital output value of A/D converter 36 is that of the highest threshold below the input voltage. As can be seen from the example shown, the sum of the digital values output by converter 36 is equal to 318, which when divided by the number of samples (i.e., 16) that comprise a cycle, results in an average by 19.875. The average obtained (i.e., 19.875)

when multiplied by the mv per quantization level (i.e., 8 mv) provides a precise value (i.e., 159) for the correction signal without introducing the quantization error normally attending A/D converters.

As a result of the introduction of the dither signal by dither source 65, the effective resolution of A/D converter 36 has been increased by a factor of 4, from +/−4 mv to +/−1 mv. Actually, since the signal contains random noise filling in the 2 mv steps, resolution will be increased even further if multiple cycles of the dither waveform are averaged.

While the invention has been described with reference to the structure disclosed, it is not confined to the details set forth, but is intended to cover such modifications or changes as may come within the scope of the following claims.

We claim:

1. A calibration method for obtaining accurate correction values for correcting for non-uniformity among the photosites of a scanning array, comprising the steps of:
    (a) scanning a calibration image of preset density to provide an image signal output from each of the array photosites;
    (b) introducing a dither signal into the image signal output of each of said photosites to provide an artificially distorted image signal output from each of said photosites;
    (c) converting the distorted image signals to digital signals;
    (d) averaging a plurality of such artificially distorted signals from each of said photosites;
    (e) determining a digital correction voltage for correcting non-uniform photosensors of the array; and
    (f) converting the digital correction voltages to analog and adjusting the image signal outputs of the non-uniform photosites by combining the image signal output of each photosite with the corrective voltage for that photosensor.

2. A method for calibrating the photosensors of a scanning array to correct for inherent variations among the array photosensors and neutralize quantization errors, comprising:
    (a) scanning a calibration image of preset density to provide an image signal output representative of the calibration image from each of said array photosensors;
    (b) deliberately introducing an error signal into the image signal outputs of each of said photosensors whereby to provide a distorted image signal output from each of said array photosensors;
    (c) repeating steps a and b a plurality of times while continuously varying the error signals introduced into the image signal outputs of said array photosensors whereby to provide a plurality of different distorted image signals from each of said array photosensors; and
    (d) averaging said plurality of distorted image signals from each of said photosensors to provide date for determining a corrective signal for each of said array photosensors for adjusting the image signal output of said photosensors to correct for variations between photosensors.

3. The method of claim 2 including the step of:
    introducing a preset number of said error signals such that the average of said signals is zero.

4. A method for calibrating the photosensors of a scanning array to correct inherent variations among the array photosensors, comprising:
    (a) scanning a calibration image of preset density to provide an image signal representative of the calibration image scanned from each of said array photosensors;
    (b) introducing a dither signal with said image signal to provide a combined image signal from each of said photosensors;
    (c) repeating steps a and b using different dither signals each time said calibration image is scanned whereby to obtian a plurality of different combined image signals for each of said photosensors; and
    (d) averaging said combined image signals for each of said photosensors to provide data for determining a corrective signal for each of said photosensors for correcting the image signal output of each of said photosensors for inherent variations among the array photosensors during subsequent scanning by said array.

5. The method according to claim 4 including the step of:
    introducing a predetermined pattern of different combined image signals such that on averaging, the average of said combined image signals is zero.

* * * * *